Feb. 23, 1965   R. T. FIELDS   3,170,190
EXTRUSION APPARATUS
Filed Aug. 6, 1963
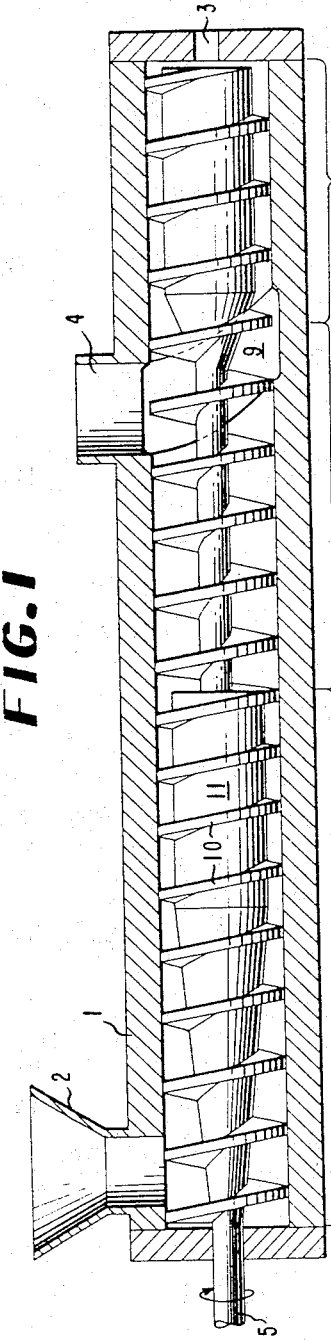
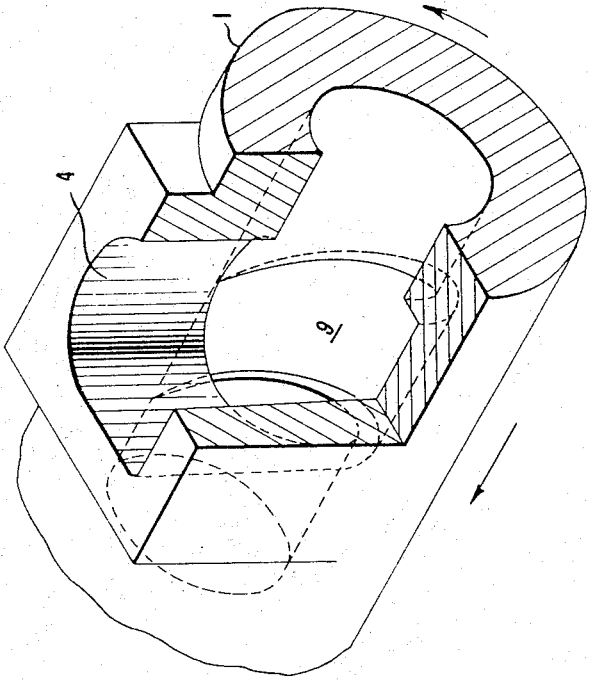
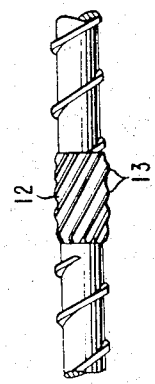
INVENTOR
REUBEN T. FIELDS
BY *Earl L. Handley*
ATTORNEY United States Patent Office 3,170,190
Patented Feb. 23, 1965

3,170,190
EXTRUSION APPARATUS
Reuben Thomas Fields, Wilmington, Del., assignor to E. I. du Pont de Nemours and Company, Wilmington, Del., a corporation of Delaware
Filed Aug. 6, 1963, Ser. No. 300,334
7 Claims. (Cl. 18—12)

This invention relates to an extrusion apparatus for use in plastic fabrication processes. More particularly, this invention relates to an extrusion apparatus for use with plastic and like materials, having high melt viscosity. Specifically, this invention relates to an extrusion apparatus having a devolatilization port in the extruder barrel which will not plug up when high melt viscosity materials are extruded through the barrel.

It is known in the art to blend plastic and like materials with modifiers such as plasticizers, lubricants, dyes, pigments, and the like, by means of an extrusion apparatus. It is further known that when such materials are blended, it is highly desirable at some point in the extrusion apparatus to provide a devolatilization port through which gases formed by the vaporization of moisture, solvents, and low molecular weight monomer, may escape. Such devolatilization ports are usually provided on the down stream side of a highly compressive or choke section of the extrusion apparatus. See for example, U.S. Patent 2,829,399, issued to Caracciolo et al. on April 8, 1958, and U.S. Patent 2,970,341 issued to Mallory et al. on February 7, 1961. Such extrusion apparatus is highly satisfactory when used to extrude plastic and like materials having normal melt viscosities, but considerable difficulty occurs when it is attempted to extrude high melt viscosity materials through such apparatus, for the plastic material tends to plug the devolatilization port, and the extruder screw, which is supposed to take the plastic material away from the devolatilization port, does not fill uniformly thus resulting in a non-uniform feed of plastic at the outlet orifice of the extruder.

It is an object of this invention to provide a simple modification of an extrusion apparatus that will allow the extruder screw to fill uniformly on the downstream side of a devolatilization port thus assuring a uniform feed of plastic material at the outlet orifice of the extruder, and at the same time, eliminate the plugging problem of the devolatilization port when operating on plastic materials of high melt viscosities. Other objects will be apparent from the remainder of the specification.

The extrusion apparatus of the present invention has a single extruder screw located in an extrusion barrel. The extruder screw has at least two helically grooved tandemly arranged compressive screw sections, each screw section having the same direction of helical twist. The compressive screw sections are separated by an intermediate section. The compressive screw sections of the extruder screw are designed so that the pressure (compression) on the polymer is increased as it passes from one end of the compressive screw section to the other. This result may be accomplished by providing the compressive screw sections with tapered roots that increase in diameter toward the outlet end of each compressive screw section. The intermediate section of the extruder screw is designed so that the polymer upon entering this section is under substantially less compressive force than it is when in the compressive sections. This result may be accomplished if the root of the intermediate section is substantially smaller than the largest diameter of the compressive screw section. A devolatilization port is provided in the extruder barrel near the outlet end of the intermediate section of the extruder screw as it is located in the extruder barrel. This port may be merely open to the atmosphere, or preferably attached to a vacuum box to aid in the withdrawal of volatile materials such as monomer, solvents, moisture, and the like. At the point where the devolatilization port enters the extrusion barrel, the internal surface of the barrel is recessed. The recess extends around the internal surface of the barrel in the direction which the extrusion screw is adapted to turn. The recess may extend less than half a turn or considerably further if desired. The recess is preferably of the same width as the devolatilization port and preferably extends helically toward the outlet end of the extruder, although the recess need not be helical in form. Preferably, the recess is uniformly tapered from the point of entry of the devolatilization port to its end, the deepest area of the recess being immediately adjacent the devolatilization port. The depth of the recess will vary somewhat according to the size of the extruder barrel, and according to the viscosity of the material that is to be extruded, but the depth need never exceed about ⅛ inch, and in many cases substantially shallower recesses are satisfactory.

The invention will be readily understood by reference to the drawings in which FIGURE 1 is a side elevation view of the extruder partly in cross-section showing the extruder screw and the recess area.

FIGURE 2 is an isometric fragmentary view of the devolatilization port and helical recess. The arrows in FIGURE 2 show the direction of movement of material through the barrel, and the direction of rotation of a screw in the barrel.

FIGURE 3 is a side elevation view of an extruder screw having a compressive screw section of a different type from that of FIGURE 1.

In FIGURE 1, the extruder barrel 1 is shown to have an inlet port 2 and an outlet die 3, and a devolatilization port 4. The extruder screw 5 having root section 11 and thread section 10, located within the extrusion barrel has compressive screw sections 6 and 7 and intermediate section 8. Helical recess 9 located in the wall of the extrusion barrel begins at the point of entry of the devolatilization port and extends around the barrel in the direction that the extrusion screw is adapted to turn.

In FIGURE 2 only the portion of the extruder barrel adjacent the devolatilization port 4 is shown. Helical recess 9 is shown to extend about ¾ of a turn around the barrel.

FIGURE 3 shows an extruder screw similar to that of FIGURE 1 with an alternative form of the compressive screw section, which section 12 comprises a helical screw of an increased number of flights 13.

Referring specifically to the apparatus of FIGURES 1 and 2: High specific melt viscosity polymer to be extruded is introduced through inlet port 2 in the solid state. The compression in compressive screw section 6 is such that by the time the polymer has reached the end of section 6 it is in the molten state. The polymer then enters intermediate section 8. Since compressive section 6 has a much larger root than section 8, section 8 is only about ⅓ full of polymer, and since the pressure on the polymer in section 8 is substantially less than that in section 6, any volatile materials are vaporized. The polymer and the vapor then passes under devolatilization port 4 where the vapor is removed. The polymer then passes to compressive screw section 7 having a root diameter larger than section 8, but no bigger than the root diameter of section 6, and thence to outlet die 3. The size and shape of outlet die 3 will determine the length of compressive screw section 7 and the root diameter of section 7. This section must be able to deliver as much material through the outlet die 3 as is delivered by section 6 into intermediate section 8. In order to insure that section 7 can deliver the same amount of material as section 6 delivers to section 8, section 7 conventionally has a smaller root diameter than does section 6, and the length of section 7 is selected such that it will cause sufficient pressure at outlet die 3 to extrude the amount of material delivered to section 8 by section 6. Higher pressure at outlet die 3 will, of course, necessitate a longer section 7.

An interpolymer of hexafluoropropylene and tetrafluoroethylene having a specific melt viscosity about $1 \times 10^5$, producible by the process disclosed in U.S. Patent No. 2,946,763, issued July 26, 1960, to Bro et al., was introduced into a 2-inch extrusion apparatus about 7 feet long, such as that illustrated in FIGURE 1, except that the recess 9 was not present in the barrel. The compressive screw sections 6 and 7 had a 3 to 1 compression ratio. The 2-inch circular devolatilization port plugged with resin almost at once, and replugged with resin just as soon as unplugged. The extrusion operation was stopped, and the barrel ground with a hand grinder to form a recess in the wall about 1/16 inch deep and extending approximately 3/4 a helical turn around the barrel. The recess was more or less tapered from the point of entry of the devolatilization port to the end of the helical recess. The helical recess had the same pitch as the extruder screw. Resin was again introduced into the extruder barrel, and no plugging of the devolatilization port occurred, and the extrusion apparatus operated in a highly satisfactory manner.

I claim:

1. In an extruder for plastic and like materials comprising an extruder screw of substantially uniform diameter, rotatably located in a horizontally disposed extrusion barrel, said extrusion barrel having an inlet port and an outlet port in close proximity to opposite ends of the extruder, said extruder screw comprising at least two helically grooved tandemly arranged compressive screw sections having the same direction of helical twist, separated by an intermediate section, said intermediate section being located between said inlet port and said outlet port of said extrusion barrel, said extrusion barrel having at least one devolatilization port located in the barrel wall surrounding the intermediate section of the extruder screw, the improvement which comprises a recess in the wall of the extrusion barrel beginning at the point of entry of the devolatilization port, said recess extending around said barrel on its internal surface in the direction in which the extruder screw is adapted to turn.

2. The extruder of claim 1 in which the recess is helical in form and extends toward the outlet die.

3. The extruder of claim 2 in which the recess extends for one full helical turn toward the outlet die.

4. The extruder of claim 3 in which the helical form of the recess is of the same helical pitch as the extruder screw, and of the same width as the longitudinal distance across the devolatilization port.

5. The extruder of claim 1 in which the compressive screw sections are formed by an increased root size of the extruder screw.

6. The extruder of claim 1 in which the compressive screw sections are formed by an increase in the number of flights on the extruder screw.

7. The extruder of claim 1 in which the recess is tapered from the point of entry of the devolatilization port to the end of the recess.

References Cited in the file of this patent
UNITED STATES PATENTS

| | | |
|---|---|---|
| 2,829,399 | Caramolo et al. | Apr. 8, 1958 |
| 3,023,456 | Pulfey | Mar. 6, 1962 |
| 3,031,030 | Rodenacker | Apr. 24, 1962 |
| 3,101,511 | Heston | Aug. 27, 1963 |